(12) United States Patent
Tago (10) Patent No.: US 12,092,917 B2
(45) Date of Patent: Sep. 17, 2024

(54) DISPLAY APPARATUS

(71) Applicant: Japan Display Inc., Tokyo (JP)

(72) Inventor: Keiji Tago, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/481,309

(22) Filed: Oct. 5, 2023

(65) Prior Publication Data

US 2024/0118570 A1    Apr. 11, 2024

(30) Foreign Application Priority Data

Oct. 7, 2022   (JP) ................. 2022-162557

(51) Int. Cl.
*G02F 1/1335*     (2006.01)
*F21V 8/00*       (2006.01)

(52) U.S. Cl.
CPC ..... *G02F 1/133514* (2013.01); *G02B 6/0076* (2013.01)

(58) Field of Classification Search
None
See application file for complete search history.

(56) References Cited

U.S. PATENT DOCUMENTS

| | | | |
|---|---|---|---|
| 5,629,783 A | * 5/1997 | Kanbara | G02F 1/133617 349/72 |
| 2021/0096406 A1 | * 4/2021 | Miyao | G02F 1/133615 |
| 2022/0299807 A1 | 9/2022 | Ohue | |

FOREIGN PATENT DOCUMENTS

| JP | 2020-181050 A | 11/2020 |
|---|---|---|
| JP | 2021-092702 A | 6/2021 |

* cited by examiner

*Primary Examiner* — Phu Vu
(74) *Attorney, Agent, or Firm* — Michael Best & Friedrich LLP (57) ABSTRACT

The display apparatus includes: a first substrate having a first front surface and a first back surface opposite to the first front surface; a second substrate having a second back surface facing the first front surface and a second front surface opposite to the second back surface; a liquid crystal layer arranged between the first front surface of the first substrate and the second back surface of the second substrate; a first light guide plate bonded and fixed onto the first back surface of the first substrate through a first bonding layer; a second light guide plate bonded and fixed onto the second front surface of the second substrate through a second bonding layer; and a coloring film overlapping the liquid crystal layer in a direction of stacking the first substrate, the second substrate, the liquid crystal layer, the first light guide plate and the second light guide plate.

8 Claims, 10 Drawing Sheets

DISPLAY APPARATUS

CROSS-REFERENCE TO RELATED APPLICATION

The present application claims priority to Japanese Patent Application No. 2022-162557 filed on Oct. 7, 2022, the disclosure of which is incorporated herein by reference.

TECHNICAL FIELD OF THE INVENTION

The present invention relates to a display apparatus using a liquid crystal layer.

BACKGROUND OF THE INVENTION

As an example of a display apparatus using a liquid crystal layer, there is a transparent display apparatus allowing an observer as described in a Patent Document 1 and a Patent Document 2 to recognize a display image and a background while overlapping them.

The Patent Document 1 (Japanese Patent Application Laid-Open Publication No. 2020-181050) describes a transparent display apparatus including an ultraviolet-ray cutting layer covering a liquid crystal layer in order to suppress breakage or damage on the liquid crystal layer due to ultraviolet rays.

The Patent Document 2 (Japanese Patent Application Laid-Open Publication No. 2021-092702) describes a transparent display apparatus having a structure capable of improving transparency of the transparent display apparatus by improving light transmittance of substrates sandwiching a liquid crystal layer.

RELATED ART DOCUMENTS

Patent Documents

Patent Document 1: Japanese Patent Application Laid-Open Publication No. 2020-181050
Patent Document 2: Japanese Patent Application Laid-Open Publication No. 2021-092702

SUMMARY OF THE INVENTION

The inventors of the present application have developed a transparent display apparatus allowing an observer to recognize a display image and a background while overlapping them. Generally, a display panel of the transparent display apparatus is clear and colorless. Therefore, it is desirable to further enhance design performance (a degree of freedom of design) of the display panel.

And, when an image such as a letter displayed on the transparent display apparatus is displayed with a white color, if a background to be visually recognized through the transparent display apparatus by the observer is, for example, white, there is a problem that is low visual recognition of the image.

An object of the present invention is to provide a technique capable of improving a performance of a display apparatus.

Other object and novel characteristics will be apparent from the description of the present specification and the accompanying drawings.

The outline of the typical aspects of the embodiments disclosed in the present application will be briefly described as follows.

A display apparatus according to one embodiment includes: a first substrate having a first front surface and a first back surface opposite to the first front surface; a second substrate having a second back surface facing the first front surface and a second front surface opposite to the second back surface; a liquid crystal layer arranged between the first front surface of the first substrate and the second back surface of the second substrate; a first light guide plate bonded and fixed onto the first back surface of the first substrate through a first bonding layer; a second light guide plate bonded and fixed onto the second front surface of the second substrate through a second bonding layer; a light source unit arranged at a position facing a first side surface of the second light guide plate; and a coloring film overlapping the liquid crystal layer in a direction of stacking the first substrate, the second substrate, the liquid crystal layer, the first light guide plate and the second light guide plate.

DESCRIPTIONS OF THE PREFERRED EMBODIMENTS

Hereinafter, embodiments of the present invention will be described with reference to the accompanying drawings. Note that disclosure shows only one example, and appropriate modification with keeping the concept of the present invention which can be easily anticipated by those who are skilled in the art is obviously within the scope of the present invention. Also, in order to make the clear description, a width, a thickness, a shape, and others of each portion in the drawings are schematically illustrated more than those in an actual aspect in some cases. However, the illustration is only one example, and does not limit the interpretation of the present invention. In the present specification and each drawing, similar elements to those described earlier for the already-described drawings are denoted with the same or similar reference characters, and detailed description for them is appropriately omitted in some cases.

In the following embodiment, a liquid crystal display apparatus configured to display images by using scattering of visible light caused by liquid crystal molecules will be exemplified and explained as an example of a display panel used in combination with a glass plate.

The liquid crystal display apparatus is an apparatus forming display images by changing alignment of molecules contained in the liquid crystal layer, and needs a light source. In an embodiment explained below, the light source is arranged separately from the display panel. Therefore, the display panel and a light source module supplying visible light to the display panel will be explained below while being distinguished from each other.

EMBODIMENT

First Configuration Example

Figure 1:
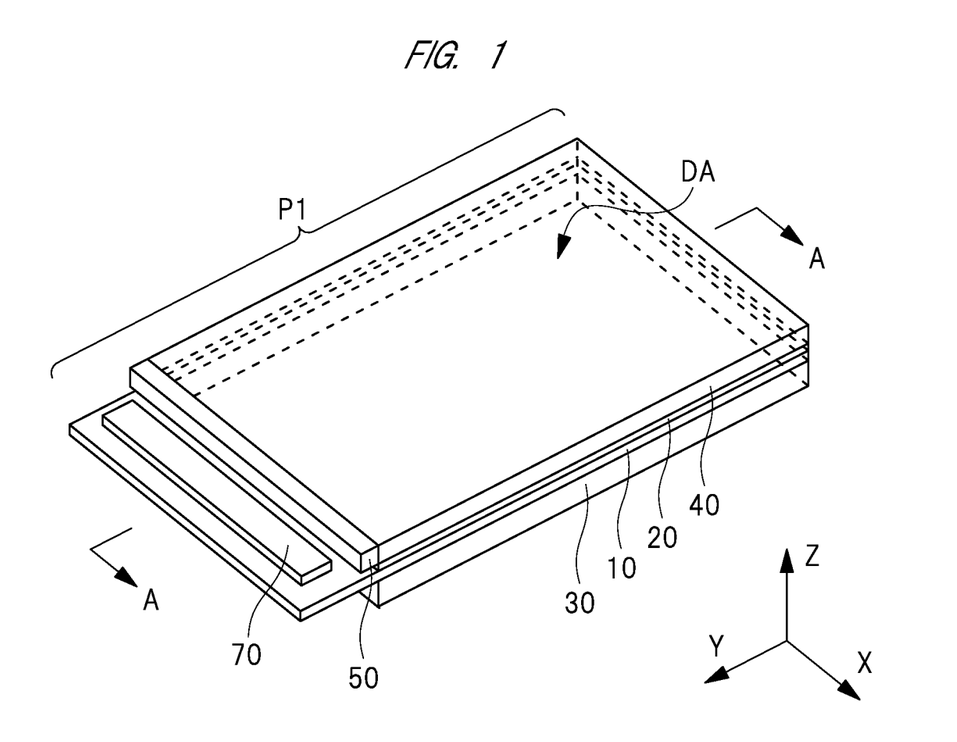
FIG. 1 is a perspective view showing a first configuration example of a transparent display apparatus according to an embodiment.
Figure 2:
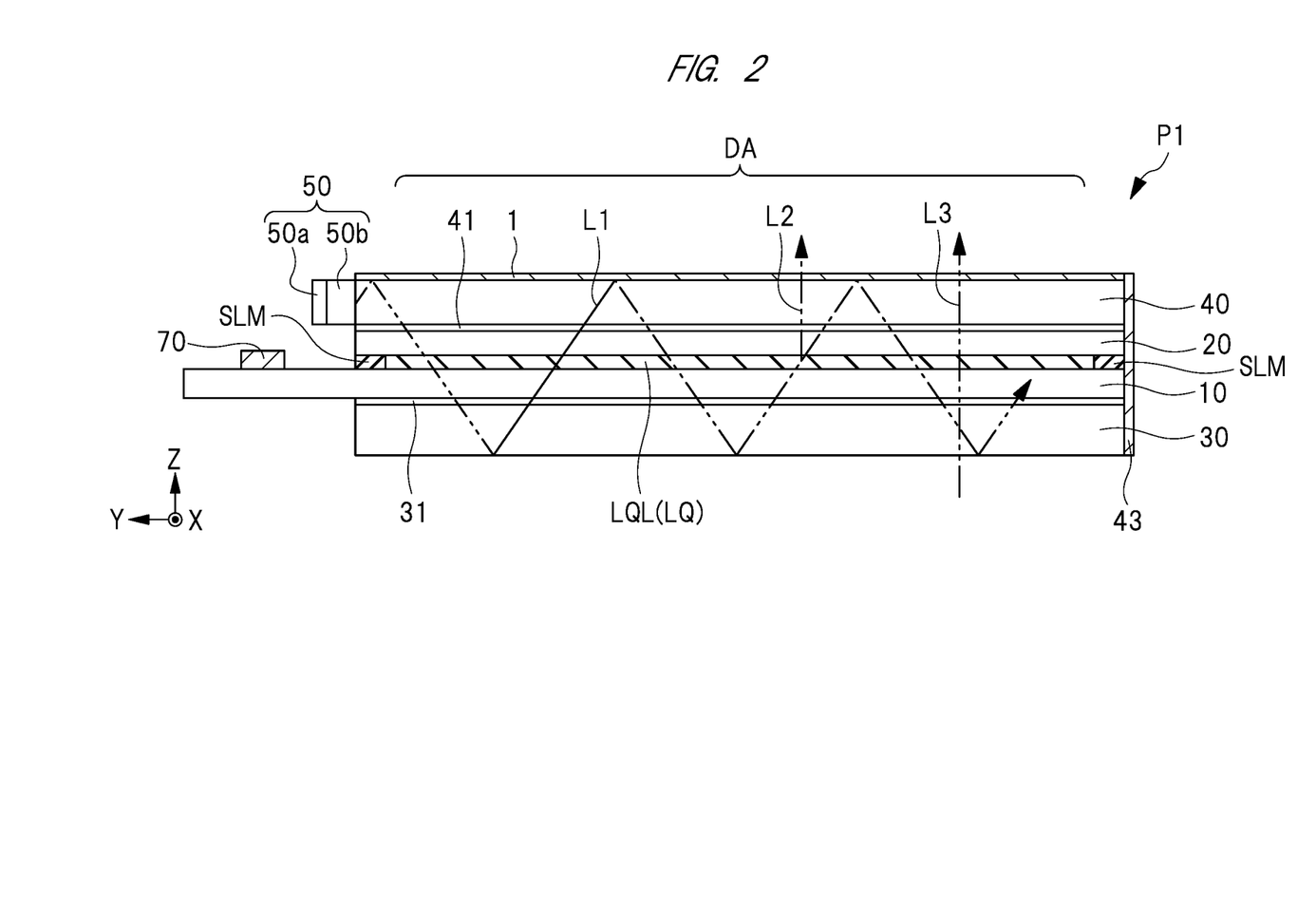
FIG. 2 is a cross-sectional view taken along a line A-A of FIG. 1.

Features of a transparent display panel according to a first configuration example of the present embodiment will be explained. FIG. 1 is a perspective view showing a transparent display panel (transparent display apparatus) according to the first configuration example of the display apparatus of the present embodiment. The following drawings including FIG. 1 will be explained in assumption that a direction along a thickness direction of a display panel P1 is a Z direction, and an extending direction of one side of the display panel P1 on an X-Y plane orthogonal to the Z direction is an X direction while a direction crossing the X direction is a Y direction. FIG. 2 is a cross-sectional view taken along a line A-A of FIG. 1. In FIG. 2, illustration of partial hatching is omitted for easily understanding a state of light propagation.

As shown in FIG. 1, the display panel P1 of the present embodiment includes a substrate (array substrate) 10, a substrate (oppose substrate) 20, a light guide plate (first light guide plate, first cover glass) 30, a light guide plate (second light guide plate, second cover glass) 40, a light source unit 50 and a driver circuit 70.

A configuration of the display apparatus occasionally includes, for example, a control circuit, a flexible substrate connected to the display panel P1, a housing or others in addition to each component of the display panel P1 shown in FIG. 1. In FIG. 1, illustration of parts other than the display panel P1 is omitted.

The display panel P1 has a display region DA where images are formed in response to input signals supplied from outside. The display panel P1 also has a peripheral region surrounding a periphery of the display region DA in plan view. Note that the display region DA of the display panel P1 shown in FIG. 1 has a quadrangular shape. However, the display region may have a shape such as a polygonal shape, a circular shape or others other than the quadrangular shape. In plan view in which a display surface is viewed, the display region DA is an effective region where the display panel P1 displays the images. Each of the substrate 10, the substrate 20, the light guide plate 30 and the light guide plate 40 is at a position overlapping the display region DA in plan view.

In the example shown in FIG. 1, the driver circuit 70 is mounted on the substrate 10. The light source unit 50 is arranged in contact with a side surface of the light guide plate 40, but only needs to have a structure capable of guiding the light emitted from the light source unit 50, from the side surface of the light guide plate 40 into the light guide plate 40, and the mounting portion of the light source unit 50 is not limited to this. For example, the light source unit 50 may be mounted on the substrate 10. The light source unit 50 includes, for example, a plurality of light emitting diodes.

First, a light path of the light emitted from the light source unit 50 in the display panel P1 shown in FIG. 2 will be explained. As shown in FIG. 2, the light source unit 50 includes a light source 50a made of a plurality of light emitting diodes and a lens 50b. The display panel P1 includes the substrate 10 and the substrate 20 pasted to face each other through a liquid crystal layer LQL. The substrate 10 and the substrate 20 are arranged in the Z direction that is the thickness direction of the display panel P1. In other words, the substrate 10 and the substrate 20 face each other in the thickness direction of the display panel P1 (in the Z direction). The substrate 10 has the front surface (main surface, surface) facing the liquid crystal layer LQL (and the substrate 20). The substrate 20 has the back surface (main surface, surface) facing the front surface of the substrate 10 (and the liquid crystal layer LQL).

The substrate 10 is an array substrate in which a plurality of transistors (transistor elements) functioning as switching elements (active elements) are arranged in array form. Each of the transistors is, for example, a TFT (Thin Film Transistor). The substrate 20 is a substrate formed close to the display surface with respect to the substrate 10 that is the array substrate. The substrate 20 can be regarded as a counter substrate meaning a substrate facing the array substrate.

The liquid crystal layer LQL containing liquid crystal LQ is between the front surface of the substrate 10 and the back surface of the substrate 20. The liquid crystal layer LQL is an optical modulator element. The display panel P1 has a function of modulating light passing therethrough by using the switching element to control a state of electric field formed around the liquid crystal layer LQL. The display regions DA in the substrate and the substrate 20 overlap the liquid crystal layer LQL in plan view.

The substrate 10 and the substrate 20 are bonded to each other through a sealing portion (sealing member) SLM. As shown in FIG. 2, the sealing portion SLM is arranged to surround the periphery of the display region DA in plan view. In other words, the liquid crystal layer LQL is inside the sealing portion SLM. The sealing portion SLM plays a role of a sealing for sealing the liquid crystal into the gap between the substrate 10 and the substrate 20. The sealing portion SLM plays a role of a bonding member for bonding the substrate 10 and the substrate 20.

The back surface of the substrate 10 is bonded and fixed to the light guide plate 30 through a bonding layer 31. The front surface of the substrate 20 is bonded and fixed to the light guide plate 40 through a bonding layer 41. The light guide plate 30 has a front surface facing the back surface of the substrate 10 and a back surface opposite to the front surface. The light guide plate 30 is bonded and fixed to the substrate 10 through the bonding layer 31. In at least the display region DA, a gap between the light guide plate 30 and the substrate 10 is filled with the bonding layer 31. In the example shown in FIG. 2, the bonding layer 31 is bonded to the entire front surface of the light guide plate 30.

Although not illustrated, a protective film may be formed between the bonding layer 41 and the light guide plate 40. Alternatively, a low refractive layer may be formed between the bonding layer 41 and the light guide plate 40. In other words, the low refractive layer (transparent layer) may interpose in a partial region between a back surface of the light guide plate 40 and a front surface of the protective film. The protective film is made of a transparent material capable of transmitting the visible light. A thickness of the protective film is, for example, about 1 μm. The low refractive layer is a layer having a lower refractive index than those of all the substrate 10, the substrate 20, the light guide plate 30, the light guide plate 40, the bonding layer 31 and the bonding layer 41. The low refractive layer does not cover the entire display region DA but overlaps a part of the display region DA in plan view.

The light guide plate 40 has a back surface facing the front surface of the substrate 20 and a front surface opposite to the back surface. The light guide plate 40 has a side surface facing the light source unit 50 and a side surface opposite to this side surface. Each of the side surfaces is a surface connecting the back surface and the front surface of the light guide plate 40 at a position between the back surface and the front surface of the light guide plate 40. Each of the side surfaces is a surface extending in a direction (Z direction) orthogonal to each of the back surface and the front surface of the light guide plate 40. The light guide plate 40 is bonded and fixed to the substrate 20 through the bonding layer 41. In at least a part of the display region DA, a gap between the light guide plate 40 and the substrate 20 is filled with the bonding layer 41. In other words, the light guide plate 40 is pasted to the substrate 20 through the bonding layer 41.

Each of the bonding layer 31 and the bonding layer 41 is made of a transparent resin material capable of transmitting the visible light. As examples of the visible-light transmittable bonding layers 31 and 41, a transparent bonding sheet that is called OCA (Optical Clear Adhesive) of a sheet shape, an OCR (Optical Clear Resin) used by hardening of a liquid-type transparent adhesive and others are exemplified.

The display panel P1 shown in FIG. 2 has a structure in which the light source unit 50 is arranged at a position not overlapping the display region DA in order to secure the transmission for the visible light at the front surface and the back surface. The display panel P1 has a function of delivering the light to the side surface of the light guide plate 40, the surface opposite to the side surface thereof facing the light source unit 50, by using difference in refractive index between a surrounding air layer and the light guide plate 30, the light guide plate 40, and the substrate 10 and the substrate 20 to reflect light-source light L1. The light-source light L1 is light emitted from the light source unit 50. A mirror (reflecting tape) 43 is pasted to a side surface of the display panel P1 including the side surface of the light guide plate 40, the side surface opposite to the light source unit 50, in other words, a side surface of the stacked body including the substrate 10, the substrate 20, the light guide plate 30, the light guide plate 40, the bonding layer 31, the bonding layer 41 and the sealing portion SLM so that a mirror surface faces this side surface.

The light-source light L1 emitted from the light source unit 50 propagates in a direction being away from the side surface of the light guide plate 40, the side surface being close to the light source unit 50, while reflecting on the back surface of the light guide plate 30 and the front surface of the light guide plate 40. Then, the light-source light L1 having been reflected by the mirror 43 propagates toward the opposite side (close to the side surface of the display panel P1 including the side surface of the light guide plate 40, the side surface being close to the light source unit 50) while reflecting on the back surface of the light guide plate 30 and the front surface of the light guide plate 40.

The liquid crystal LQ is Polymer Dispersed Liquid Crystal (PDLC) containing liquid-crystalline polymer and liquid crystal molecules. A direction of alignment of the liquid-crystalline polymer hardly varies regardless of existence of the electric field. On the other hand, a direction of alignment of the liquid crystal molecules varies depending on the electric field when a voltage equal to or higher than a threshold value is applied to the liquid crystal LQ. When no voltage is applied to the liquid crystal LQ, optical axes of the liquid-crystalline polymer and the liquid crystal molecules are parallel to each other, and therefore, the light-source light L1 having entered the liquid crystal layer LQL is hardly scattered in the liquid crystal layer LQL and penetrates therein (transparent state). When the voltage is applied to the liquid crystal LQ, the optical axes of the liquid-crystalline polymer and the liquid crystal molecules cross each other, and therefore, the light-source light L1 having entered the liquid crystal LQ is scattered in the liquid crystal layer LQL (scattering state).

Here, as one main features of the present embodiment, the display panel P1 includes a coloring film 1 overlapping a part of or entire display region DA in plan view. In the configuration example, the coloring film 1 is in contact with the front surface of the light guide plate 40 to cover the front surface of the light guide plate 40. In other words, the coloring film 1 is close to the front surface of the light guide plate 40. The coloring film 1 is made of a color resist that can be formed by being pasted or applied onto the front surface of the light guide plate 40 or a color film that can be formed by being pasted onto the front surface of the light guide plate 40. The coloring film 1 overlaps the substrate 10, the substrate 20, the liquid crystal layer LQL, the light guide plate 30, the light guide plate 40, the bonding layer 31 and the bonding layer 41 in a direction (Z direction, stacking direction) of the substrate 10, the substrate 20, the liquid crystal layer LQL, the light guide plate 30, the light guide plate 40, the bonding layer 31 and the bonding layer 41.

The coloring film 1 is made of a material transmitting only light having a wavelength of a specific range. In other words, the coloring film 1 is made of a material making it difficult to transmit light having a wavelength of other specific range. Specifically, the coloring film 1 is as if the film was a color filter. Any color is applicable to a color of the coloring film 1 as long as the coloring film 1 has light transmissivity. However, a color different from colors contained in the images displayed on the display panel P1 is desirable. Further, as the color of the coloring film 1, single color or one color is preferable for simplifying a manufacturing process. For example, if the display panel P1 is an apparatus displaying a white letter, the color of the coloring film 1 is any color other than white. In this manner, reduction in the visual recognition of the image displayed on the display panel P1 can be prevented.

In the display panel P1, the transparent state and the scattering state are controlled by controlling the alignment of the liquid crystal LQ in the propagation path of the light-source light L1. By the liquid crystal LQ, the light-source light L1 in the scattering state is emitted as emitted light L2 from the front surface of the light guide plate 40 and the back surface of the light guide plate 30 to outside of the display panel P1. The emitted light L2 and background light L3 are visually recognized by the observer on, for example, the front surface side of the light guide plate 40. The observer can visually recognize combination of the emitted light L2 and the background light L3. The observer who is using the transparent display panel as described above can recognize the display image and the background while overlapping them.

The coloring film 1 is a film colored with a predetermined color and having light transmissivity. Therefore, the emitted light L2 and the background light L3 penetrate the coloring film 1, and are visually recognized by the observer. Therefore, the observer visually recognizes the background colored by the coloring film 1, through the display panel P1. This manner is the same as it is when the image is not displayed on the display panel P1, such as non operation of the display panel P1.

Second Configuration Example

Figure 4:
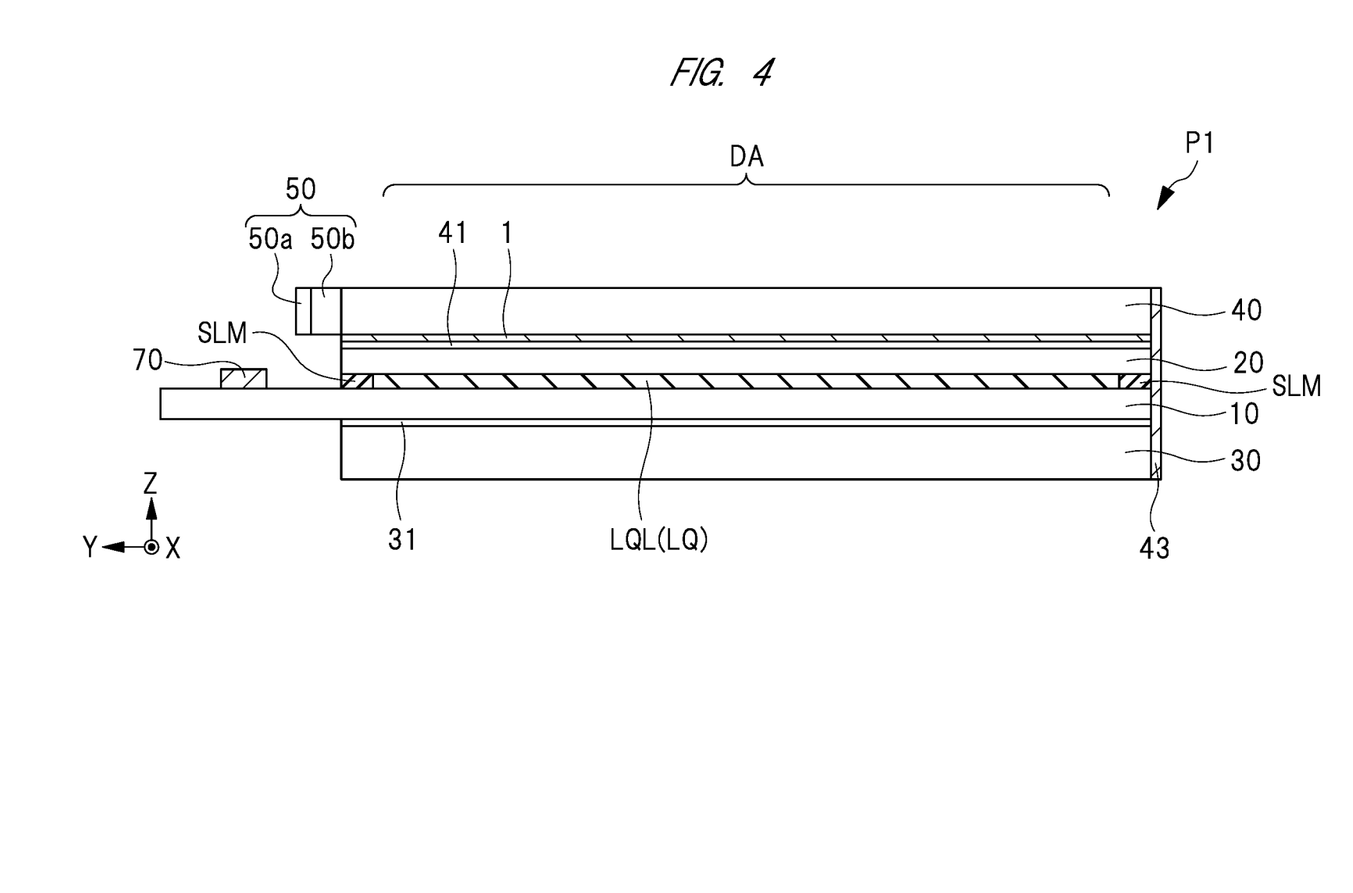
FIG. 4 is a cross-sectional view showing a second configuration example of the transparent display apparatus according to the embodiment.

FIG. 4 shows a cross-sectional view of a transparent display panel according to a second configuration example of the present embodiment. FIG. 2 shows the structure in which the coloring film 1 is positioned on the front surface of the light guide plate 40. However, as shown in FIG. 4, the coloring film 1 may be arranged between the light guide plate 40 and the bonding layer 41.

Third Configuration Example

Figure 5:
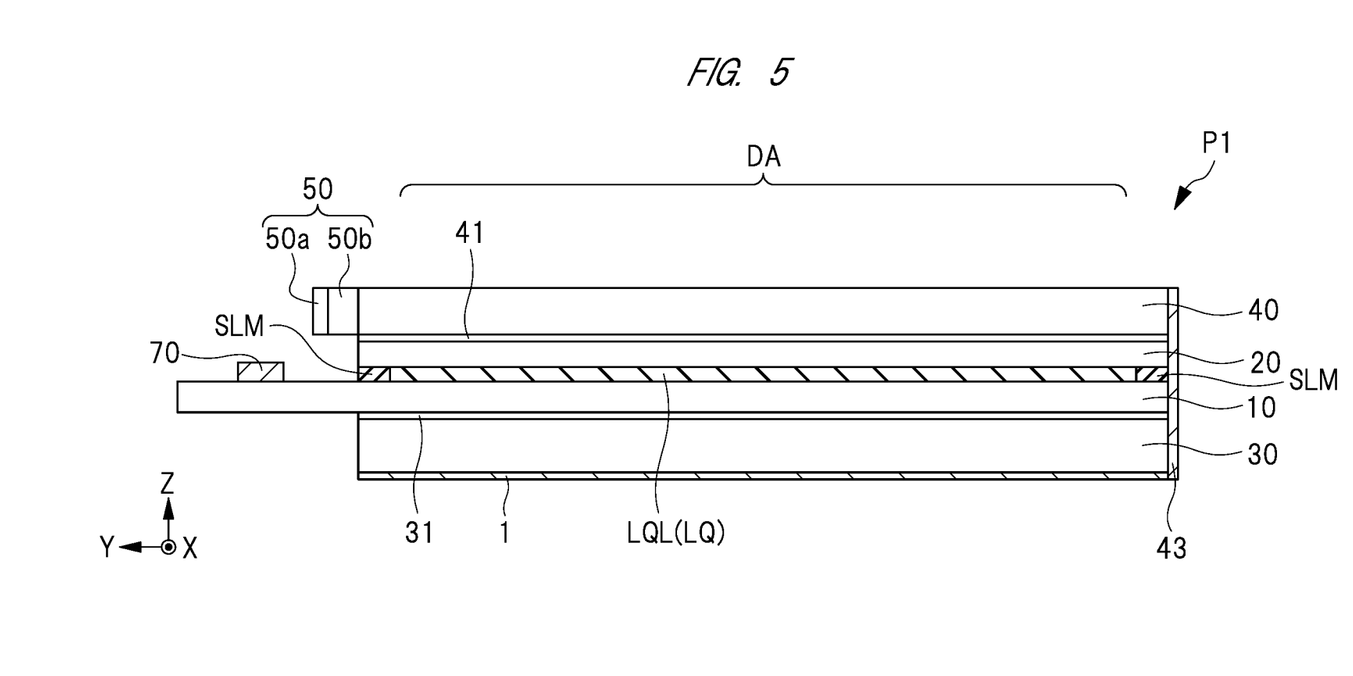
FIG. 5 is a cross-sectional view showing a third configuration example of the transparent display apparatus according to the embodiment.

FIG. 5 shows a cross-sectional view of a transparent display panel according to a third configuration example of the present embodiment. As shown in FIG. 5, the coloring film 1 may be arranged in contact with the back surface of the light guide plate 30. In other words, in this example, the coloring film 1 is close to the back surface of the light guide plate 30.

Fourth Configuration Example

Figure 6:
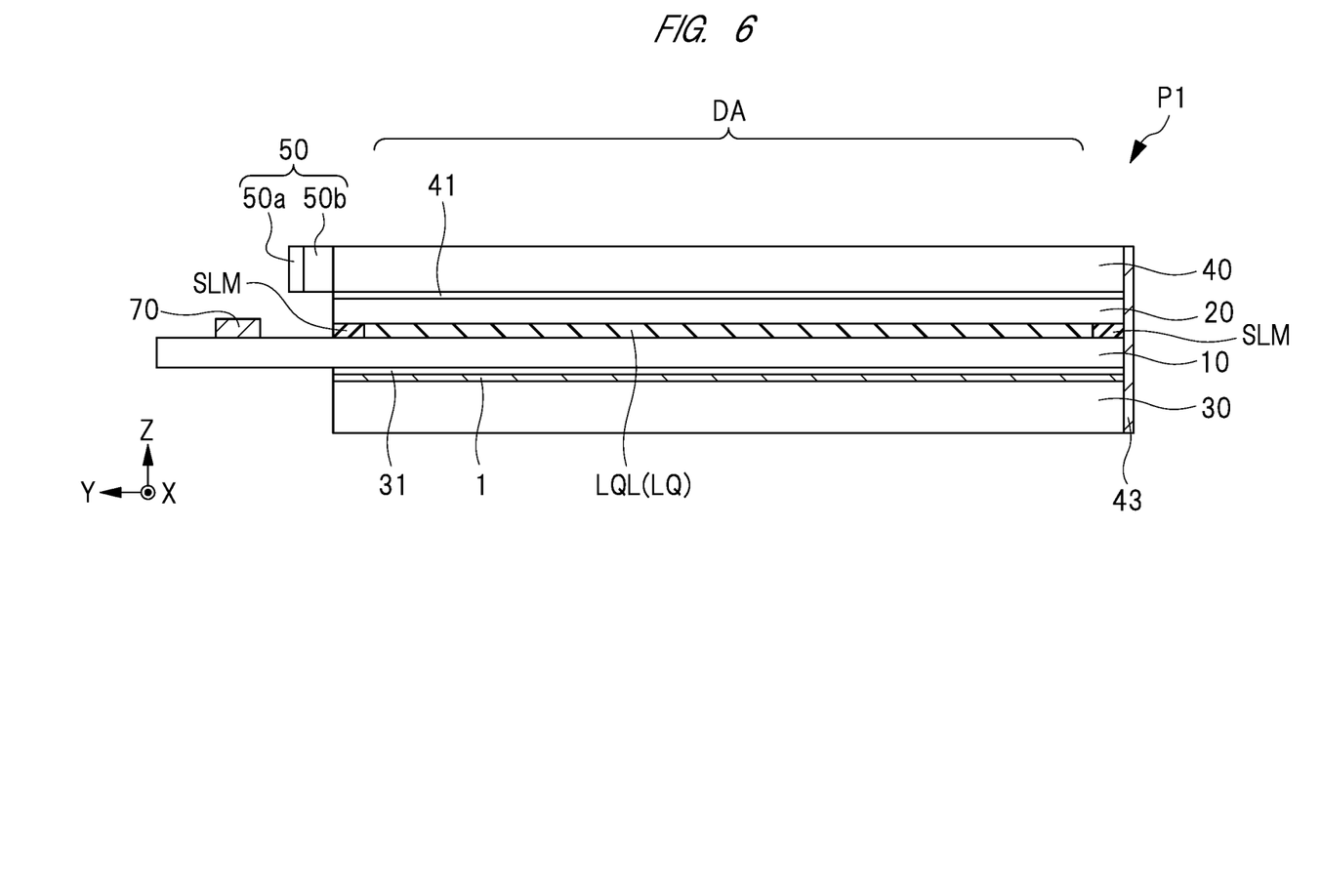
FIG. 6 is a cross-sectional view showing a fourth configuration example of the transparent display apparatus according to the embodiment.

FIG. 6 shows a cross-sectional view of a transparent display panel according to a fourth configuration example of the present embodiment. As shown in FIG. 6, the coloring film 1 may be arranged between the bonding layer 31 and the light guide plate 30.

Fifth Configuration Example

Figure 7:
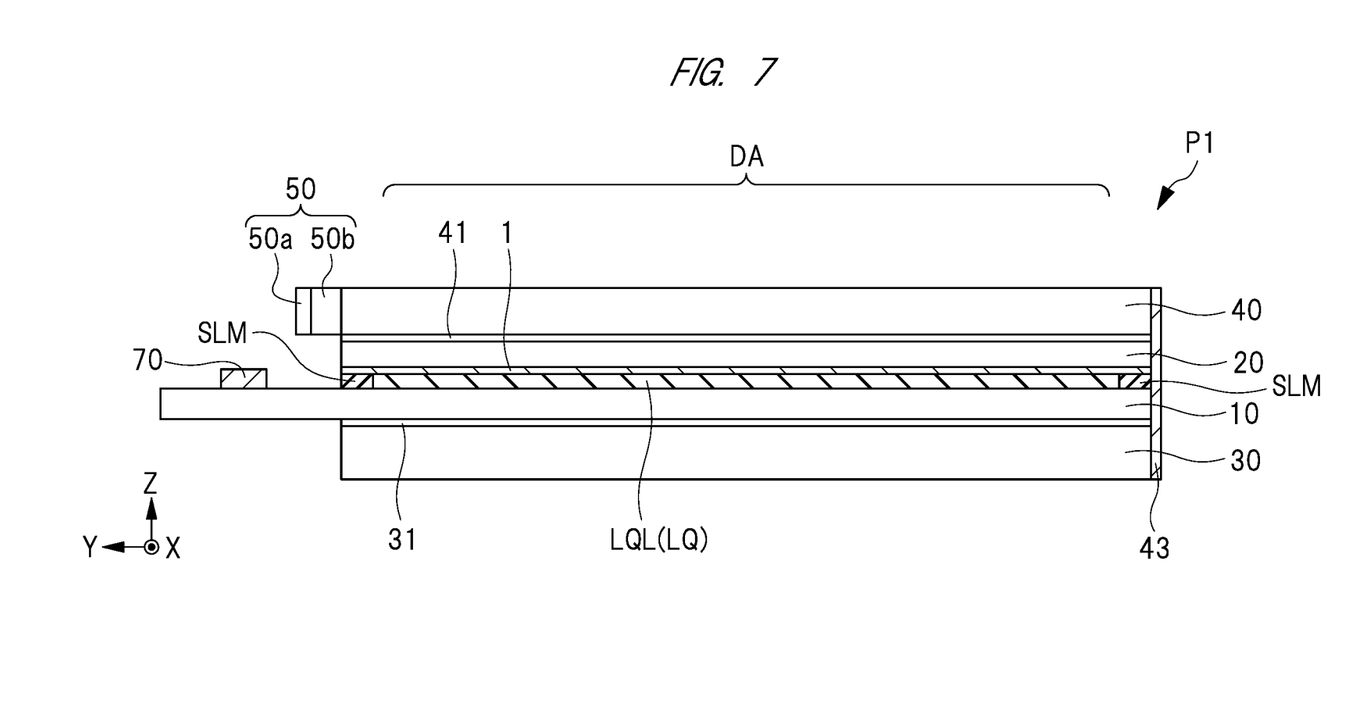
FIG. 7 is a cross-sectional view showing a fifth configuration example of the transparent display apparatus according to the embodiment.
Figure 8:
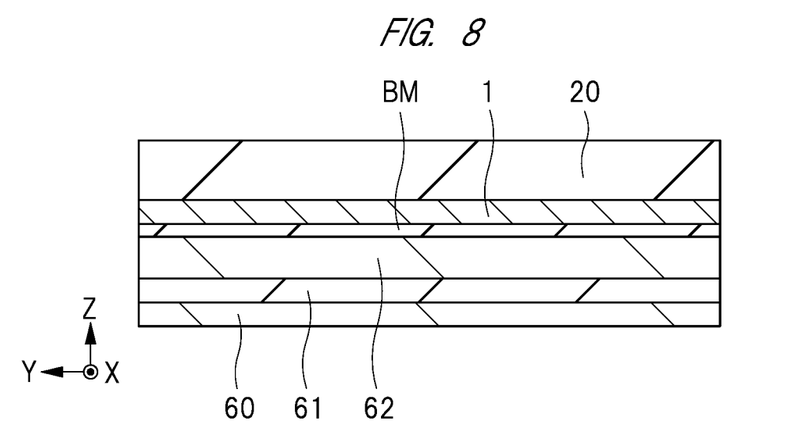
FIG. 8 is an enlarged cross-sectional view showing the fifth configuration example of the transparent display apparatus according to the embodiment.
Figure 9:
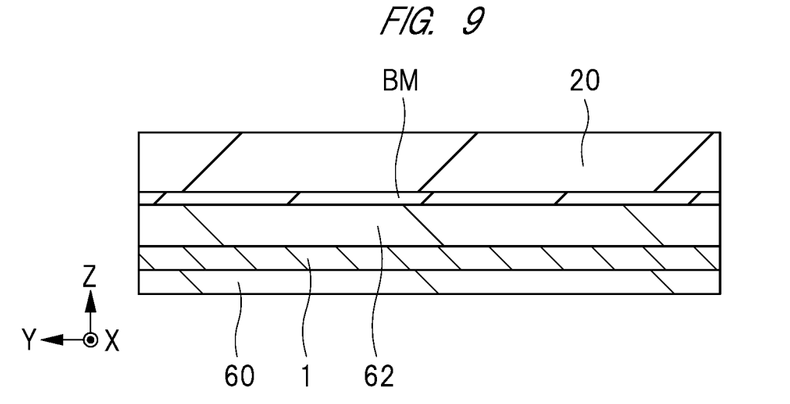
FIG. 9 is an enlarged cross-sectional view showing the fifth configuration example of the transparent display apparatus according to the embodiment.

FIG. 7 shows a cross-sectional view of a transparent display panel according to a fifth configuration example of the present embodiment. As shown in FIG. 7, the coloring film 1 may be arranged between the substrate 20 and the liquid crystal LQ. A cross-sectional view of a specific example in this case is shown in each of FIGS. 8 and 9. FIGS. 8 and 9 are cross-sectional views showing different examples from each other.

Although not illustrated in FIGS. 2 and 4 to 7, a light distributing film 60, a protective film 61, an electrode film 62 and a light blocking film BM are sequentially arranged between the liquid crystal LQ (not illustrated) and the substrate 20 in this order from the liquid crystal LQ side as shown in FIG. 8. Each of the light distributing film 60, the protective film 61 and the electrode film 62 is made of a light transmitting material. As described in the Patent Document 2, the light blocking film BM includes: a wiring arranged in the substrate 10 (TFT substrate) and connected to a TFT not illustrated; and a plurality openings overlapping the TFT and used for extracting the emitted light L2 (FIG. 2). In the example shown in FIG. 8, the coloring film 1 is arranged between the light blocking film BM and the substrate 20. In arrangement of the plurality of openings of the light blocking film BM, the coloring film 1 and the electrode film 62 are in contact with each other. Although not illustrated in FIGS. 8 and 9, the substrate 10 is arranged on the back surface side (lower side) of the light distributing film 60 through the liquid crystal LQ (liquid crystal layer LQL).

The light distributing film 60 plays a role of distributing the light-source light L1 (see FIG. 2) guided in the display panel P1. The light distributing film 60 is a horizontally aligned film having an anchoring force substantially in parallel to the X-Y plane. The protective film 61 is, for example, a transparent inorganic insulating film made of silicon nitride or others. The electrode film 62 is a transparent electrode made of, for example, indium tin oxide (ITO), indium zinc oxide (IZO) or others. The light blocking film BM is made of a material such as a black resin having high light absorbance.

In the example shown in FIG. 9, the coloring film 1 is arranged between the light distributing film 60 and the electrode film 62. In this case, in the example shown in FIG. 9, the coloring film 1 plays a role of the protective film 61 shown in FIG. 8. In other words, the coloring film 1 may be arranged in place with the protective film 61. In arrangement of the plurality of openings of the light blocking film BM, the back surface of the substrate 20 and the electrode film 62 are in contact with each other, and the substrate 20, the electrode film 62, the coloring film 1 and the alignment film 60 are stacked.

Sixth Configuration Example

Figure 10:
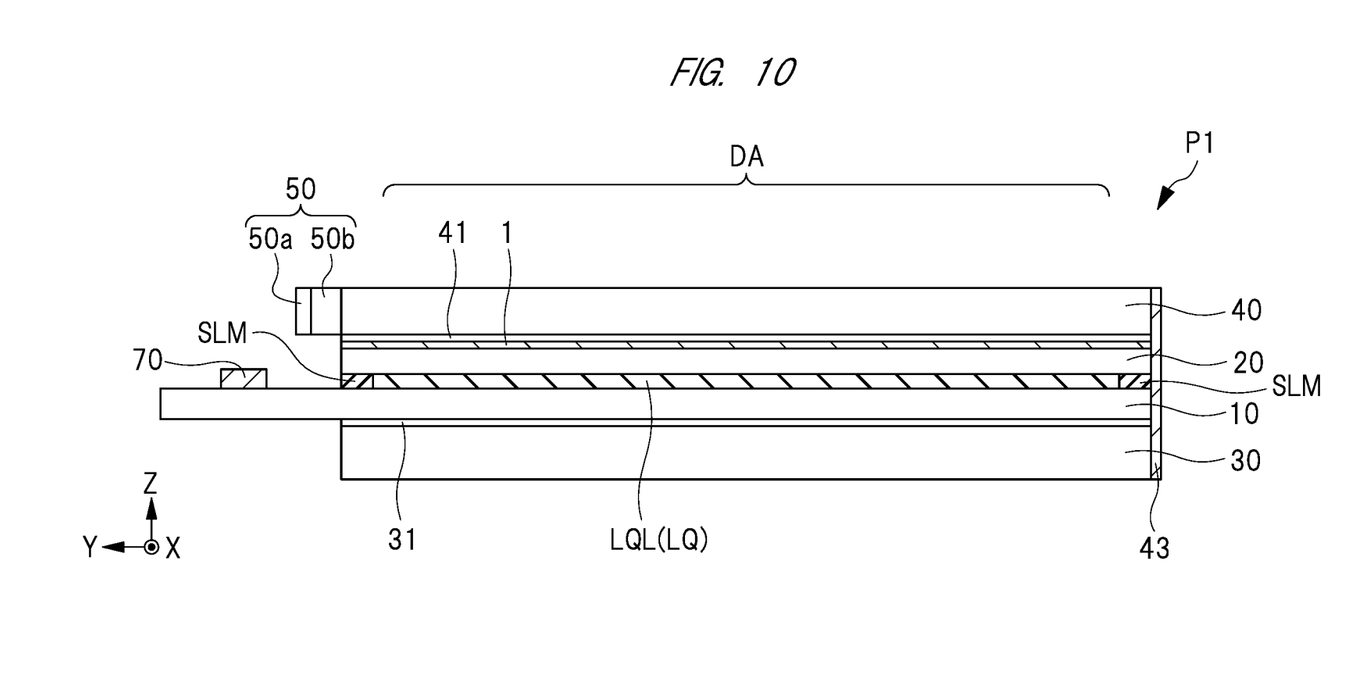
FIG. 10 is a cross-sectional view showing a sixth configuration example of the transparent display apparatus according to the embodiment.

FIG. 10 shows a cross-sectional view of a transparent display panel according to a sixth configuration example of the present embodiment. As shown in FIG. 10, the coloring film 1 may be arranged between the substrate 20 and the bonding layer 41.

Effect of Present Embodiment

Figure 3:
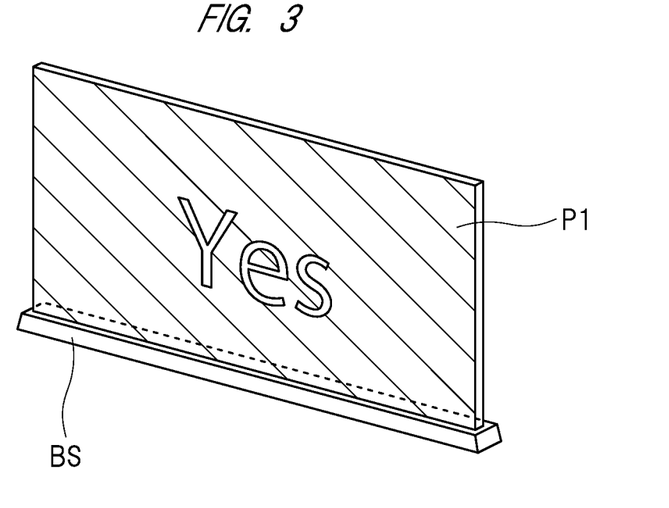
FIG. 3 is a perspective view showing a usage example of the transparent display apparatus according to the embodiment.

A usage example of the transparent display apparatus according to the present embodiment is illustrated as a perspective view of FIG. 3. As shown in FIG. 3, the display panel P1 is supported by a base stage BS, and stands with respect to an arranging surface (floor surface, horizontal surface). In other words, a surface (display surface) of the display region DA of the display panel P1 faces in a lateral direction (horizontal direction, front-and-back direction). The light source unit 50 is positioned inside the base stage BS, and the light source unit 50 guides the light-source light from the lower side toward the display region DA. When the light-source light is guided as described above in the state of the display of the liquid crystal, the light is scattered to display the images on the front and back sides. In FIG. 3, a letter "Yes" is displayed as an example on the display panel P1. This letter is displayed with, for example, a white color. Since the display panel P1 is the transparent display apparatus, the light emitted from the background side of the display panel P1 is transmitted and reaches the observer. In other words, the observer can visually recognize not only the image displayed on the display panel P1 but also the background on the other side across the display panel P1. The image displayed on the display panel P1 can be visually recognized on not only the front side but also the back side.

In the present embodiment, the coloring film 1 overlapping the display panel P1 is arranged. In this manner, the background light L3 (see FIG. 2) is colored. Therefore, the background that is visually recognized through the display panel P1 is colored at both the time of display of the image and the time of non display of the image (such as an OFF state in which the power supply is turned off). Therefore, the design performance (the degree of freedom of the design) of the display panel P1 can be enhanced.

In FIG. 3, as illustrated with a hatching, the entire display surface of the display panel P1 is colored by the coloring film 1. However, a region colored by the coloring film 1 may be a part of the display surface of the display panel P1. The region colored by the coloring film 1 may represent, for example, illustration, a letter or others. Alternatively, a plurality of coloring films 1 having different colors from one another may be arranged to represent illustration made of a plurality of colors or others.

Alternatively, when the image such as the letter displayed on the transparent display apparatus is displayed with the white color, this case has a problem that is low visual recognition of the image if the display panel of the transparent display apparatus is colorless and clear while the background that is visually recognized by the observer is white. For example, if the white letter is displayed on the display panel while the background that is visually recognized through the display panel P1 by the observer is white, this letter is difficult to be viewed for the observer. The background described herein is, for example, a desk, a wall, a document, cloth or others.

On the other hand, in the present embodiment, since the coloring film 1 is arranged, the background light L3 that is visually recognized through the display panel P1 by the observer is colored. Therefore, the observer can easily distinguish, for example, the white display image (such as letter) and the colored background, and therefore, the visual recognition of the image can be improved.

All the first to sixth configuration examples explained with reference to FIGS. 1 to 10 can provide the above-described effect. In other words, the above-described effect can be provided even when the coloring film 1 is arranged at any position of the stacking structure configuring the display panel P1.

MODIFICATION EXAMPLE

FIG. 3 shows the case in which the letter is displayed toward one direction (such as front side) of the display panel P1 as the example. In other words, when the observer views the display panel P1 from the opposite direction (such as back side), the letter is horizontally flipped, and therefore, is difficult to be read.

Figure 11:
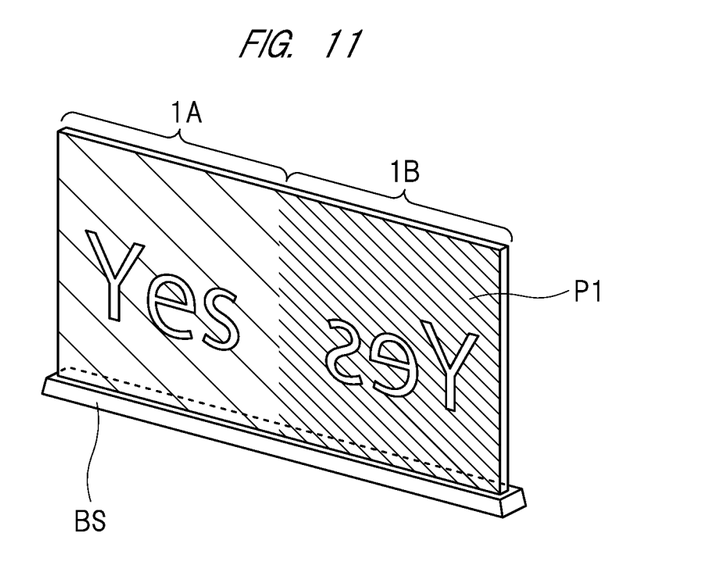
FIG. 11 is a perspective view showing a usage example of a modification example of the transparent display apparatus according to the embodiment.

In this case, FIG. 11 shows a perspective view of the display panel P1 that is a transparent display apparatus of a present modification example. In the present modification example, the display region of the display panel P1 is divided into a region 1A and a region 1B, and the letter toward the front side is displayed in the region 1A while the letter toward the back side is displayed in the region 1B. In other words, on the display panel P1, the unflipped letter and the flipped letter are simultaneously displayed. In other words, a predetermined letter is displayed at a position overlapping one of the plurality of coloring films that are lined while the horizontally-flipped letter is displayed at a position overlapping the other of them. In this manner, the unflipped letter can be displayed for a plurality of (such as two) observers facing across the display panel P1, respectively. In other words, one of the observers visually recognizes the letter (image) in the region LA while the other observer facing this observer visually recognizes the letter (image) in the region 1B, and therefore, both the observers can visually recognize the unflipped letter.

In FIG. 11, the same letter string is displayed in each of the regions 1A and 1B. However, the letters displayed in the regions 1A and 1B may be different from each other. For example, a letter string in the region A may be displayed with a specific language while a letter string in the region B may be displayed to be translated from the letter string.

In this case, in the present modification example, the coloring films having different colors are arranged in the regions 1A and 1B, respectively. These coloring films do not overlap each other in the Z direction, and are adjacent to or separate from each other in the X direction or the Y direction. In other words, a plurality of the coloring films are lined in a direction (Z direction, staking direction) that is the overlap direction of the substrates 10 and 20, the liquid crystal layer LQL, the light guide plates 30 and 40 and the bonding layers 31 and 41 (see FIG. 1), and the plurality of coloring films have different colors from one another. However, although not illustrated, the coloring films may partially overlap one another in the Z direction. The coloring films in the regions 1A and 1B may be arranged at any position of the structure example explained with reference to FIGS. 1 to 10 or different positions of the structure example from one another.

As described above, when the regions 1A and 1B are separated from each other in terms of color by the coloring films having different colors from one another, the positions to be focused in the display panel P1 can be easily found for the plurality of (such as two) observers facing across the display panel P1.

In the foregoing, the embodiments and the typical modification examples have been explained. However, the above-described techniques are applicable to various modification examples other than the exemplified modification examples. For example, the above-described modification examples may be combined with one another.

Although not described in each of the above-described configuration examples, the coloring film 1 may be formed between the substrate 10 and the liquid crystal LQ or between the substrate 10 and the bonding layer 31 below the substrate 10.

In the scope of the idea of the present invention, various modification examples and alteration examples could have been anticipated by those who are skilled in the art, and it would be understood that these various modification examples and alteration examples are within the scope of the present invention. For example, the ones obtained by appropriate addition, removal, or design-change of the components to/from/into each of the above-described embodiments by those who are skilled in the art or obtained by addition, omitting, or condition-change of the step to/from/into each of the above-described embodiments are also within the scope of the present invention as long as they include the concept of the present invention.

The present invention is applicable to a display apparatus and an electronic device in which the display apparatus is embedded.

What is claimed is:
1. A display apparatus comprising:
   a first substrate having a first front surface and a first back surface opposite to the first front surface;
   a second substrate having a second back surface facing the first front surface and a second front surface opposite to the second back surface;
   a liquid crystal layer arranged between the first front surface of the first substrate and the second back surface of the second substrate;

a first light guide plate bonded and fixed onto the first back surface of the first substrate through a first bonding layer;
a second light guide plate bonded and fixed onto the second front surface of the second substrate through a second bonding layer;
a light source unit arranged at a position facing a first side surface of the second light guide plate; and
a coloring film overlapping the liquid crystal layer in a direction of stacking the first substrate, the second substrate, the liquid crystal layer, the first light guide plate and the second light guide plate,
wherein the coloring film is arranged to be close to the second front surface of the second light guide plate.

2. The display apparatus according to claim 1,
wherein the coloring film is arranged between the second light guide plate and the second bonding layer.

3. A display apparatus comprising:
a first substrate having a first front surface and a first back surface opposite to the first front surface;
a second substrate having a second back surface facing the first front surface and a second front surface opposite to the second back surface;
a liquid crystal layer arranged between the first front surface of the first substrate and the second back surface of the second substrate;
a first light guide plate bonded and fixed onto the first back surface of the first substrate through a first bonding layer;
a second light guide plate bonded and fixed onto the second front surface of the second substrate through a second bonding layer;
a light source unit arranged at a position facing a first side surface of the second light guide plate; and
a coloring film overlapping the liquid crystal layer in a direction of stacking the first substrate, the second substrate, the liquid crystal layer, the first light guide plate and the second light guide plate,
wherein the coloring film is arranged to be close to the first back surface of the first light guide plate.

4. The display apparatus according to claim 3,
wherein the coloring film is arranged between the first bonding layer and the first light guide plate.

5. A display apparatus comprising:
a first substrate having a first front surface and a first back surface opposite to the first front surface;
a second substrate having a second back surface facing the first front surface and a second front surface opposite to the second back surface;
a liquid crystal layer arranged between the first front surface of the first substrate and the second back surface of the second substrate;
a first light guide plate bonded and fixed onto the first back surface of the first substrate through a first bonding layer;
a second light guide plate bonded and fixed onto the second front surface of the second substrate through a second bonding layer;
a light source unit arranged at a position facing a first side surface of the second light guide plate; and
a coloring film overlapping the liquid crystal layer in a direction of stacking the first substrate, the second substrate, the liquid crystal layer, the first light guide plate and the second light guide plate,
wherein the coloring film is arranged between the second substrate and the second bonding layer.

6. A display apparatus comprising:
a first substrate having a first front surface and a first back surface opposite to the first front surface;
a second substrate having a second back surface facing the first front surface and a second front surface opposite to the second back surface;
a liquid crystal layer arranged between the first front surface of the first substrate and the second back surface of the second substrate;
a first light guide plate bonded and fixed onto the first back surface of the first substrate through a first bonding layer;
a second light guide plate bonded and fixed onto the second front surface of the second substrate through a second bonding layer;
a light source unit arranged at a position facing a first side surface of the second light guide plate; and
a coloring film overlapping the liquid crystal layer in a direction of stacking the first substrate, the second substrate, the liquid crystal layer, the first light guide plate and the second light guide plate,
wherein a plurality of the coloring films are lined when viewed in the stacking direction, and
the plurality of the coloring films have different colors from one another.

7. The display apparatus according to claim 6,
wherein a predetermined letter is displayed at a position overlapping one of the plurality of the coloring films while a horizontally flipped letter is displayed at position overlapping the other of the plurality of the coloring films.

8. The display apparatus according to claim 5,
wherein the coloring film is made of a color resist or a color film.

* * * * *